United States Patent
Li et al.

(10) Patent No.: US 11,814,580 B1
(45) Date of Patent: Nov. 14, 2023

(54) HYPERBRANCHED POLYMER-BASED HYDRAULIC FRACTURING FLUID CROSSLINKER

(71) Applicants: Saudi Arabian Oil Company, Dhahran (SA); King Fahd University of Petroleum and Minerals, Dhahran (SA)

(72) Inventors: Wengang Li, Dhahran (SA); Majad Khan, Dhahran (SA); Muhammad Nawaz Tahir, Dhahran (SA); Bader Ghazi Al-Harbi, Dammam (SA)

(73) Assignees: Saudi Arabian Oil Company, Dhahran (SA); King Fahd University of Petroleum and Minerals, Dhahran (SA)

(*) Notice: Subject to any disclaimer, the term of this patent is extended or adjusted under 35 U.S.C. 154(b) by 0 days.

(21) Appl. No.: 17/836,289

(22) Filed: Jun. 9, 2022

(51) Int. Cl.
C09K 8/68 (2006.01)
E21B 43/27 (2006.01)

(52) U.S. Cl.
CPC .............. C09K 8/685 (2013.01); E21B 43/27 (2020.05)

(58) Field of Classification Search
CPC ................................ C09K 8/685; E21B 43/27
See application file for complete search history.

(56) References Cited

U.S. PATENT DOCUMENTS

| | | | |
|---|---|---|---|
| 5,445,765 A | 8/1995 | Elfers et al. | |
| 7,431,845 B2 | 10/2008 | Manek et al. | |
| 9,790,777 B2 | 10/2017 | Nguyen et al. | |
| 10,309,207 B2 * | 6/2019 | Inyang | C09K 8/5756 |
| 10,688,216 B2 | 6/2020 | Stockman et al. | |
| 2008/0153983 A1 * | 6/2008 | Boeckh | C11D 3/3723 525/96 |
| 2018/0215996 A1 * | 8/2018 | Maxey | C09K 8/805 |
| 2020/0123319 A1 | 4/2020 | Srivastava et al. | |
| 2020/0377691 A1 | 12/2020 | Zhen et al. | |
| 2021/0395898 A1 * | 12/2021 | Ul-haq | C23F 11/173 |

OTHER PUBLICATIONS

Al-Muntasheri et al., "Evaluation of a New Cost-Effective Organic Gel System for High Temperature Water Control", International Petroleum Technology Conference, IPTC 11080, pp. 1-12, Dec. 4-6, 2007.

(Continued)

*Primary Examiner* — Silvana C Runyan

(74) *Attorney, Agent, or Firm* — DINSMORE & SHOHL LLP

(57) ABSTRACT

Hydraulic fracturing fluids include an aqueous fluid, an acrylamide-based polymers, and a hyperbranched crosslinker that crosslinks the acrylamide-based polymer to form a crosslinked gel. The hyperbranched crosslinker includes a hyperbranched polyethyleneimine polyoxiranylalkanol having a weight-average molecular weight from 10 kDa to 1500 kDa. The hyperbranched crosslinker may be a product of reacting a hyperbranched polyethyleneimine with an oxiranylalkanol to obtain the hyperbranched polyethyleneimine polyoxiranylalkanol. In examples, the oxiranylalkanol is glycidol. Methods for preparing the hydraulic fracturing fluids and methods for treating subterranean formations with the hydraulic fracturing fluids are disclosed.

16 Claims, 7 Drawing Sheets

(56) References Cited

OTHER PUBLICATIONS

Amirova et al., "Influence of Cross-Linking Degree on Hydrodynamic Behavior and Stimulus-Sensitivity of Derivatives of Branched Polyethyleneimine", MDPI, Polymers, vol. 12, 1085, pp. 1-18, 2020.

Gosecki et al., "Polyglycidol, Its Derivatives, and Polyglycidol-Containing Copolymers—Synthesis and Medical Applications", MDPI, Polymers, vol. 8, 227, pp. 1-25, 2016.

Reddy et al., "Natural Polymer-Based Compositions Designed for Use in Conformance Gel Systems", Society of Petroleum Engineers, SPE Journal, pp. 385-393, Dec. 2005.

Voit et al., "Hyperbranched and Highly Branched Polymer Architectures-Synthetic Strategies and Major Characterization Aspects", Chem Review, vol. 109, pp. 5924-5973, 2009.

\* cited by examiner

HYPERBRANCHED POLYMER-BASED HYDRAULIC FRACTURING FLUID CROSSLINKER

CROSS-REFERENCES TO RELATED APPLICATIONS

None

TECHNICAL FIELD

The present disclosure relates to hydraulic fracturing fluids, to methods for preparing the hydraulic fracturing fluids, and to methods for treating subterranean formations with the hydraulic fracturing fluids.

BACKGROUND

Hydraulic fracturing has been an important technology for oil and gas production since its first application in the 1950s. Among the components of hydraulic fracturing fluids, crosslinkers play a key role to increase viscosity of the fluids during fracturing operations for controlling fluid loss and improving capacity of the fluids to carry proppants. Typical crosslinkers for hydraulic fracturing fluids may include a metal cation such as $Fe^{3+}$, $Zr^{4+}$, $Ti^{4+}$, a borate anion, or a polymer. There remain ongoing needs for crosslinkers that are compatible with hydraulic fracturing processes and provide hydraulic fracturing fluids that remain stable at elevated temperatures associated with the hydraulic fracturing processes.

SUMMARY

Hydraulic fracturing fluids according to this disclosure include an aqueous fluid, an acrylamide-based polymer, and a hyperbranched crosslinker that crosslinks the acrylamide-based polymer to form a crosslinked gel. The hyperbranched crosslinker comprises a hyperbranched polyethyleneimine polyoxiranylalkanol having a weight-average molecular weight from 10 kDa to 1500 kDa. In some examples, the hyperbranched polyethyleneimine polyoxiranylalkanol is a hyperbranched polyethyleneimine polyglycidol.

Methods are provided for preparing the hydraulic fracturing fluid including the hyperbranched polyethyleneimine polyoxiranylalkanol. The methods include combining the aqueous fluid and the acrylamide-based polymer to obtain a stock solution; adding to the stock solution at least one inert ingredient chosen from buffers, antioxidants, biocides, clay stabilizers, diverting agents, fluid loss additives, friction reducers, iron controllers, gel stabilizers, and surfactants; adjusting the pH of the stock solution to greater than 6; adding the hyperbranched crosslinker to the stock solution; and agitating the stock solution to allow a crosslinked gel to form, thereby obtaining the hydraulic fracturing fluid.

Methods of treating a subterranean formation include contacting the subterranean formation with a hydraulic fracturing fluid according to this disclosure and subsequently propagating at least one subterranean fracture in the subterranean formation with the hydraulic fracturing fluid.

These and other features, aspects, and advantages will become better understood with reference to the following description and the appended claims.

Additional features and advantages of the embodiments described herein will be set forth in the detailed description that follows, and in part will be readily apparent to those skilled in the art from that description or recognized by practicing the embodiments described herein, including the detailed description that follows, the claims, and the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
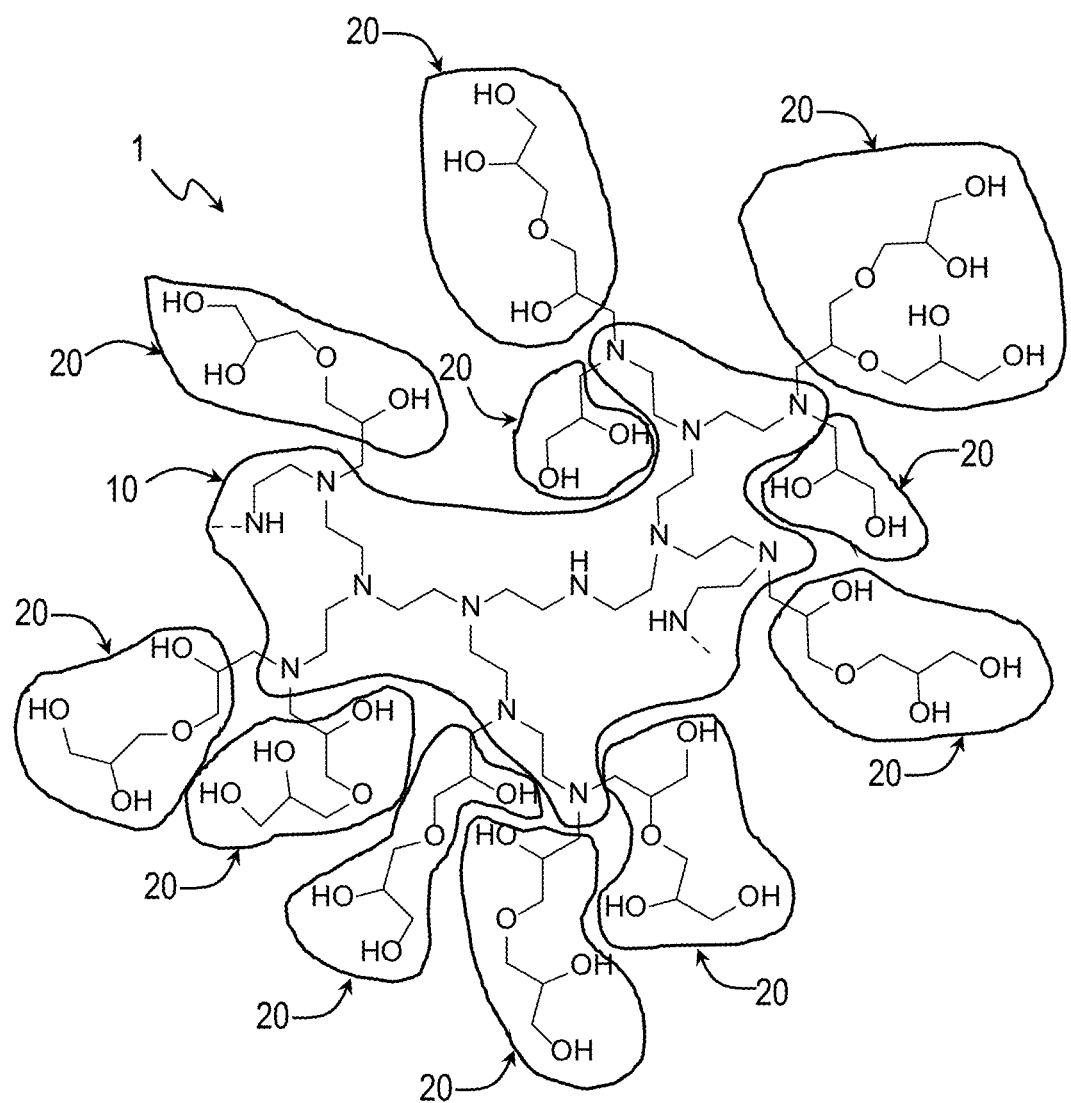
FIG. 1 is a schematic example of a hyperbranched crosslinker, specifically, a polyethyleneimine polyoxiranylalkanol, of a hydraulic fracturing fluid according to this disclosure.
Figure 2A:
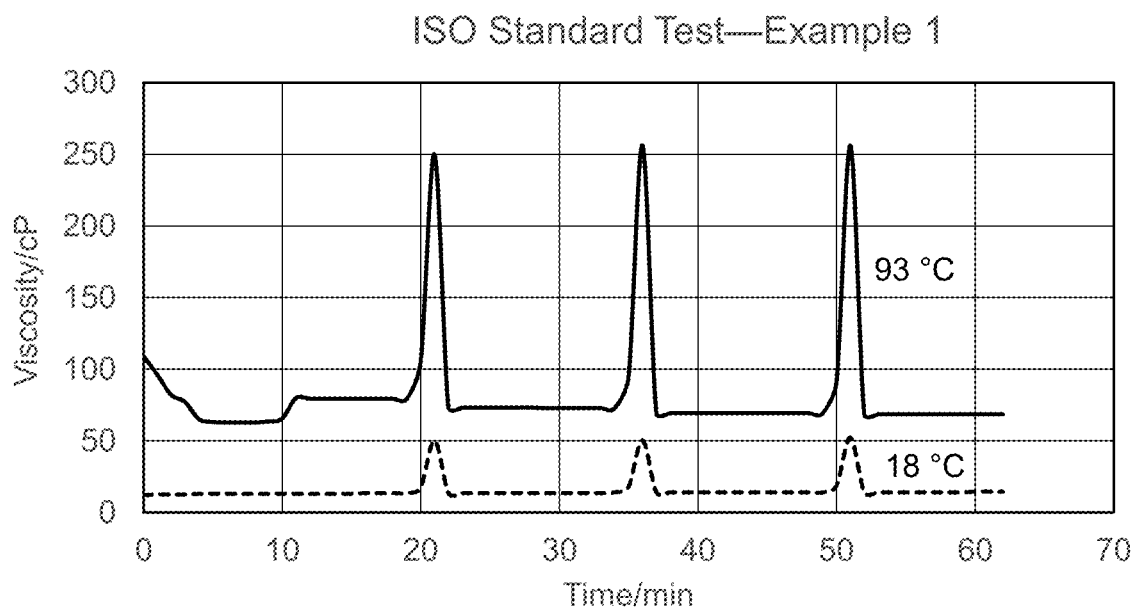
FIGS. 2A-2D are graphs of rheological data of crosslinked gels of a polyacrylamide and a hyperbranched polyethyleneimine polyglycidol crosslinker, acquired by a standard ISO13503-1 testing schedule.
Figure 2B:
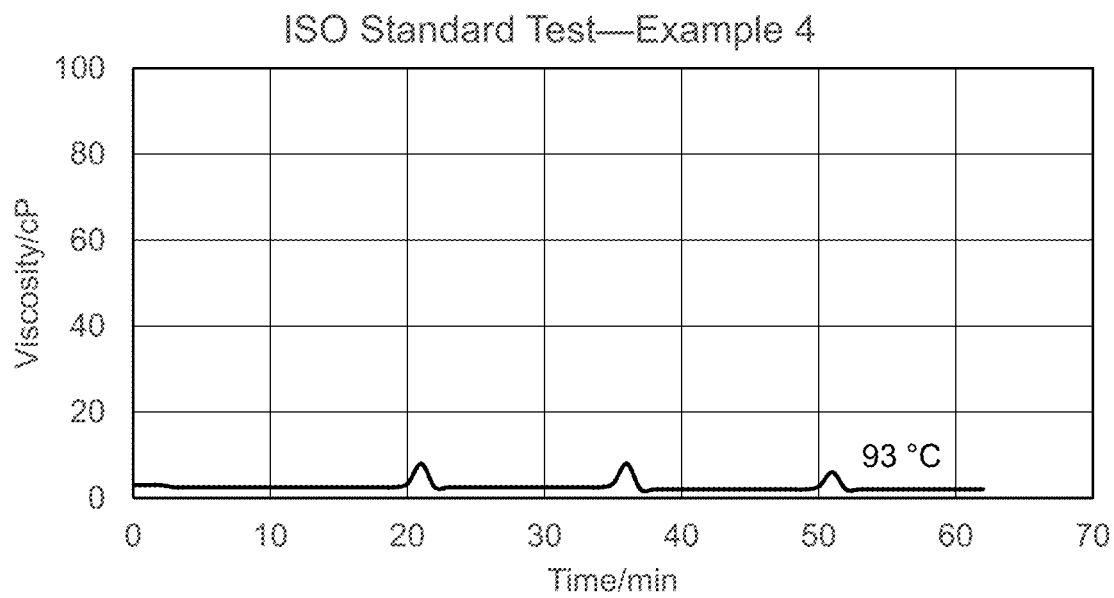
Figure 2C:
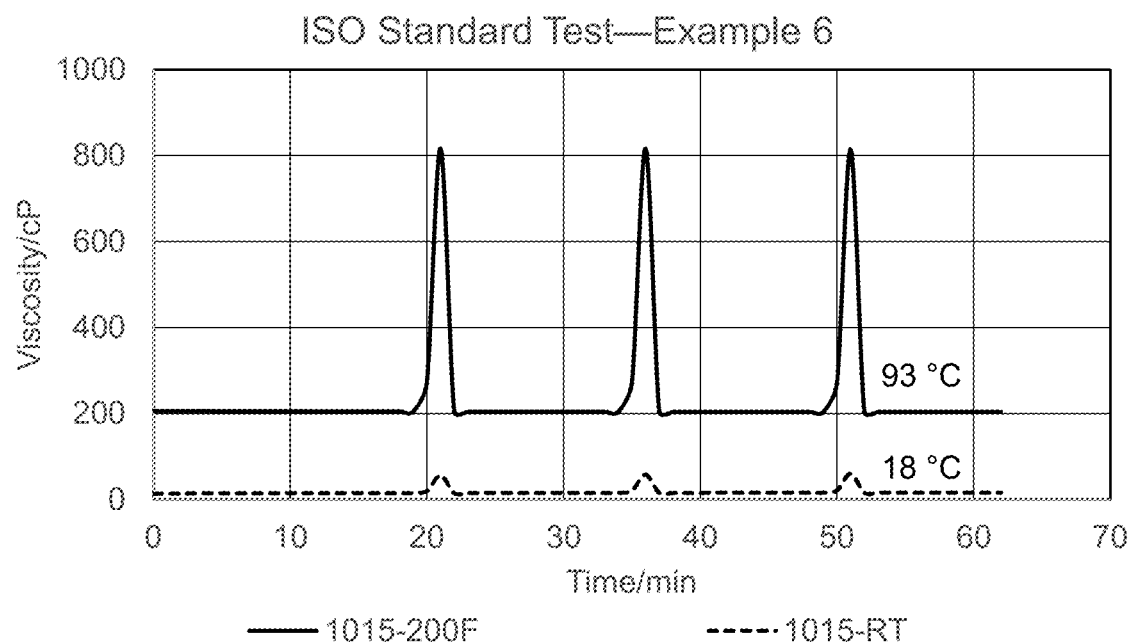
Figure 2D:
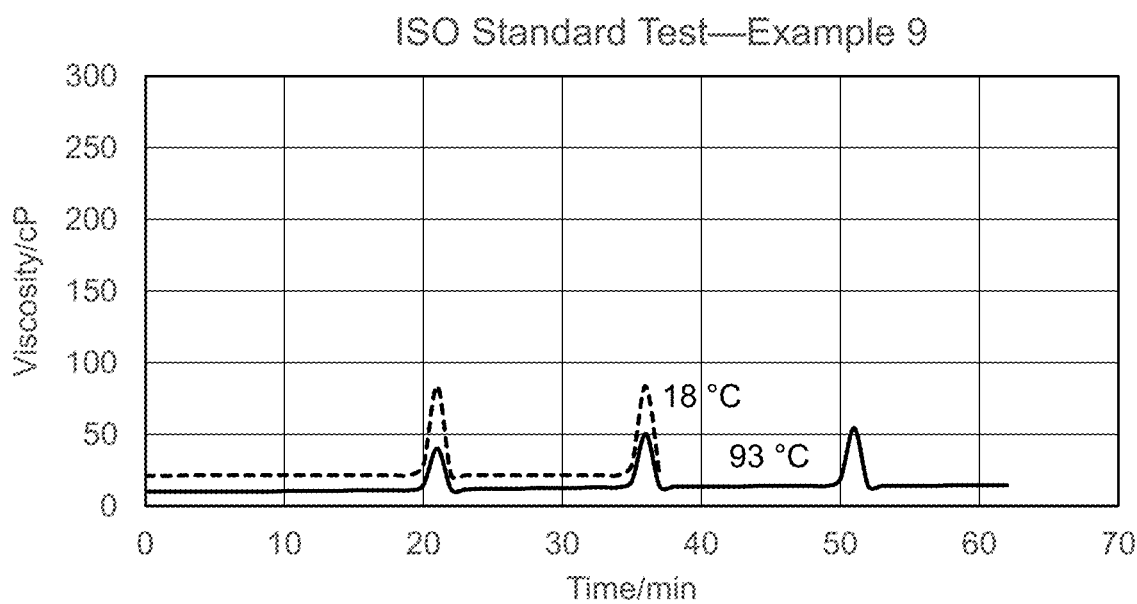
Figure 3A:
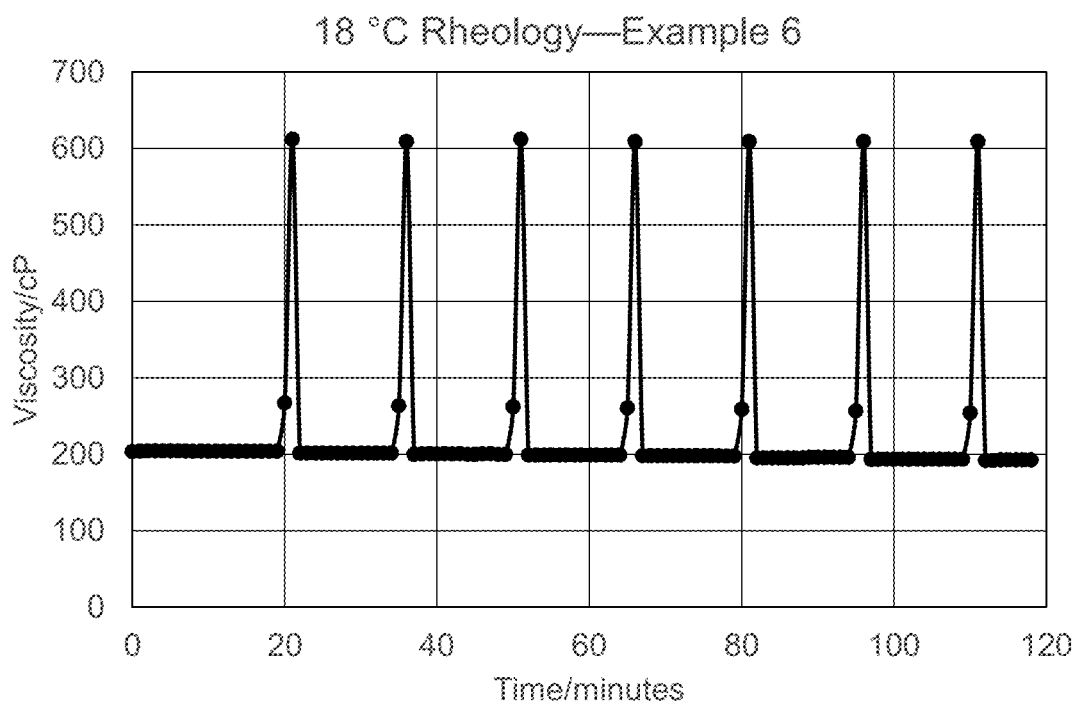
FIGS. 3A-3D are graphs of rheological data of hydraulic fracturing fluids including a hyperbranched polyethyleneimine polyglycidol crosslinker (FIGS. 3A and 3B) or a comparative hyperbranched polyethyleneimines (FIGS. 3C and 3D), measured at room temperature (18° C.).
Figure 3B:
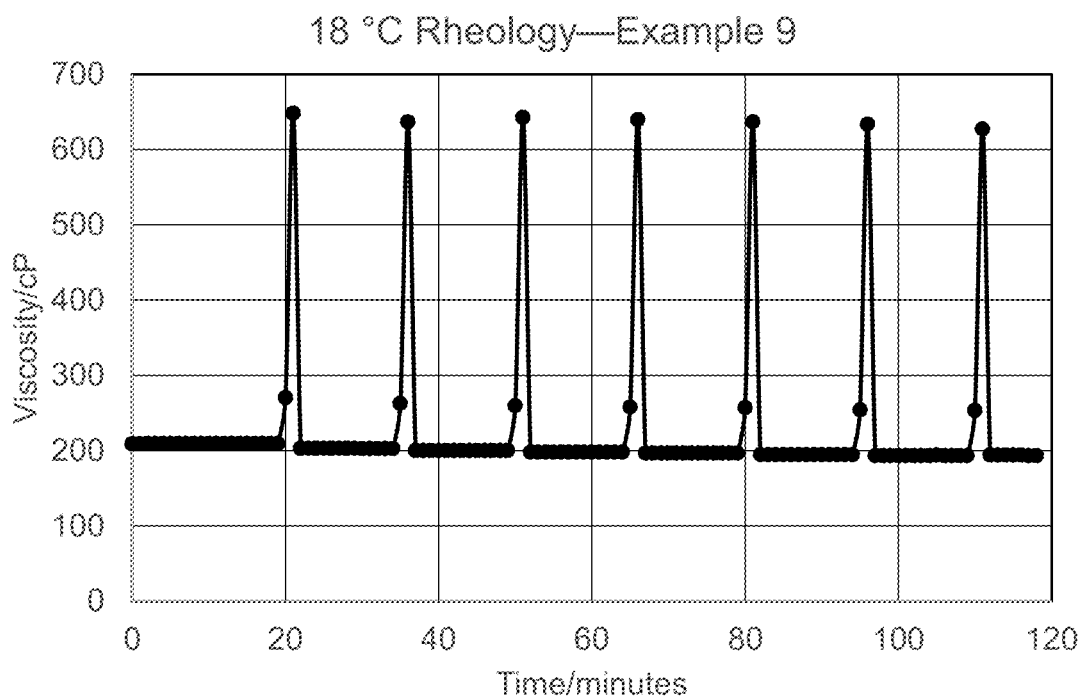
Figure 3C:
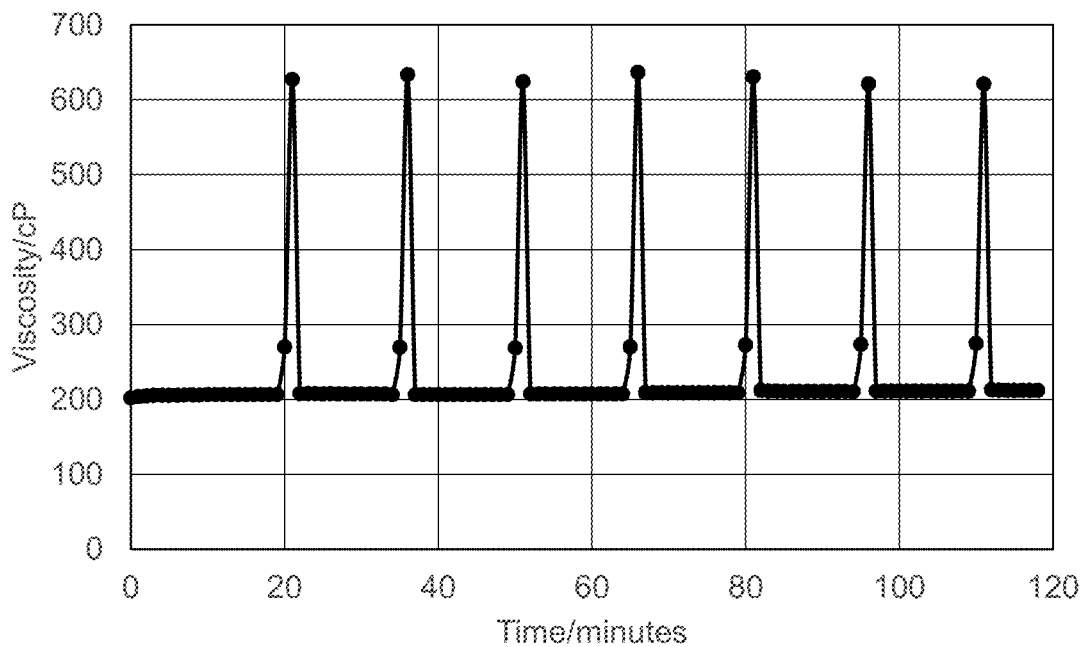
Figure 3D:
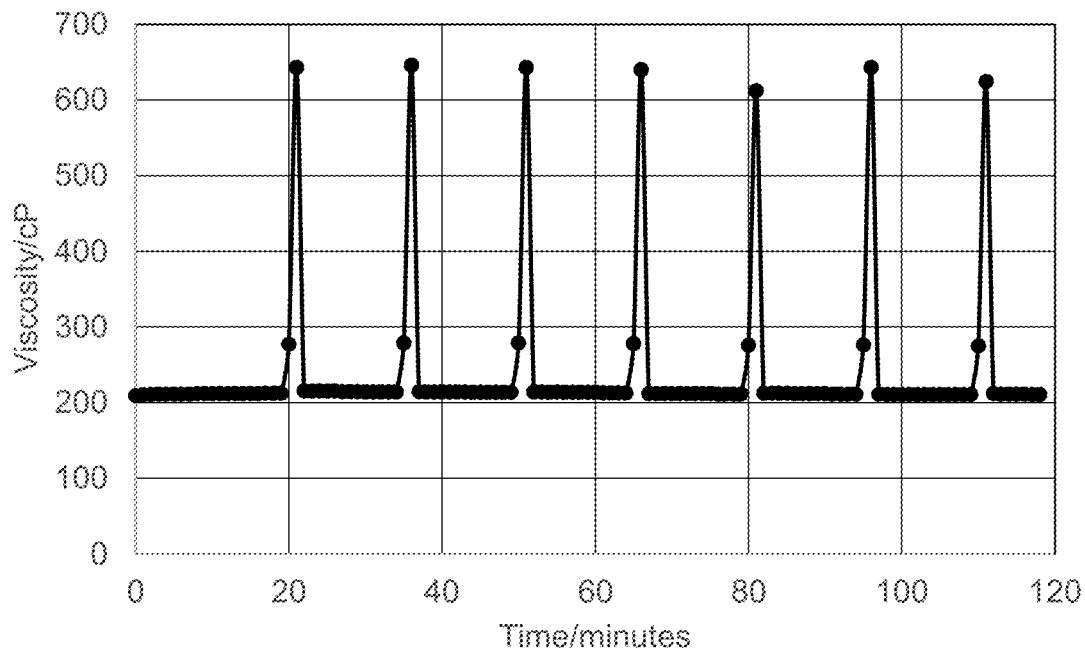
Figure 4A:
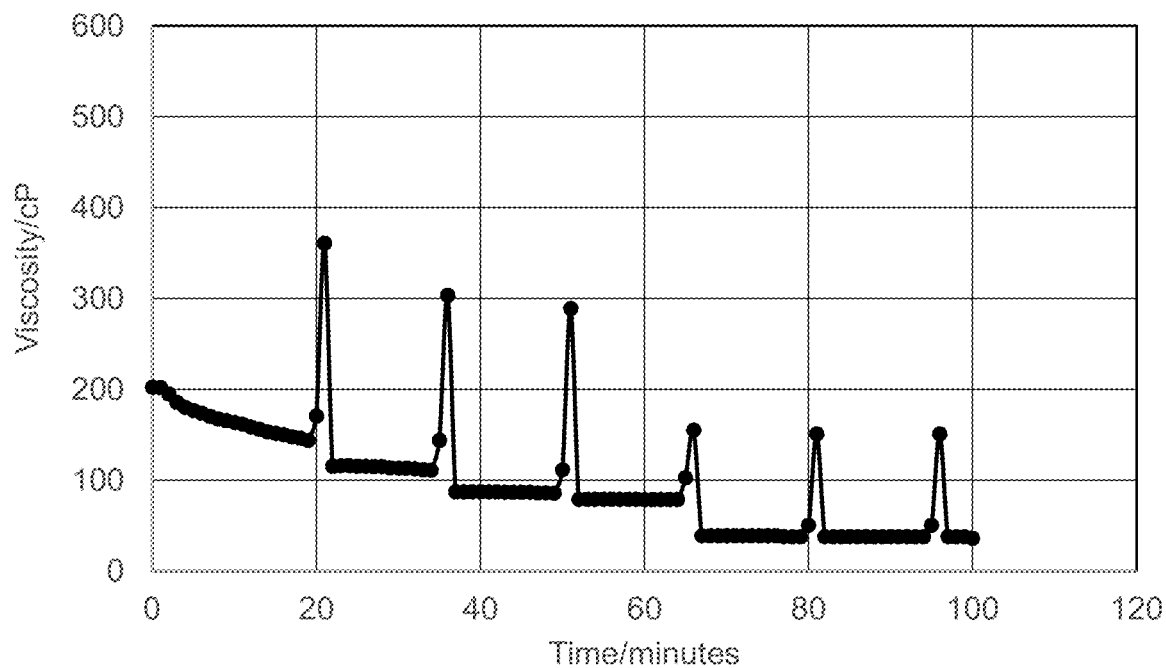
FIGS. 4A-4D are graphs of rheological data of hydraulic fracturing fluids including a hyperbranched polyethyleneimine polyglycidol crosslinker (FIGS. 4A and 4B) or a comparative hyperbranched polyethyleneimines (FIGS. 4C and 4D), measured at 200° F. (93° C.).
Figure 4B:
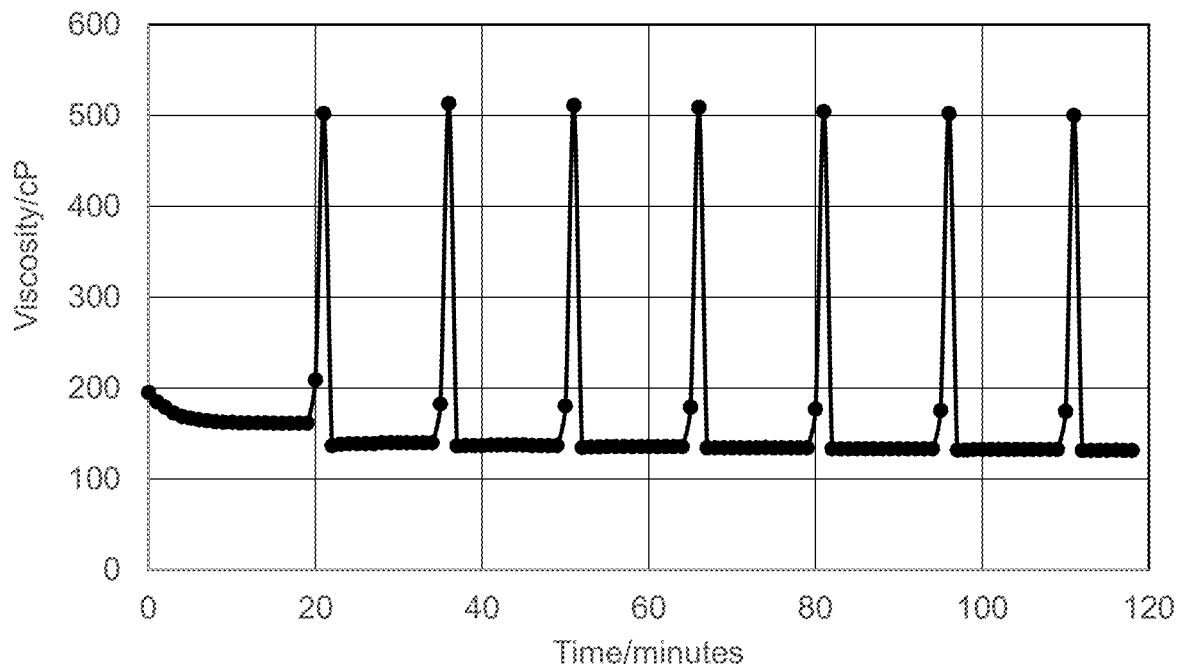
Figure 4C:
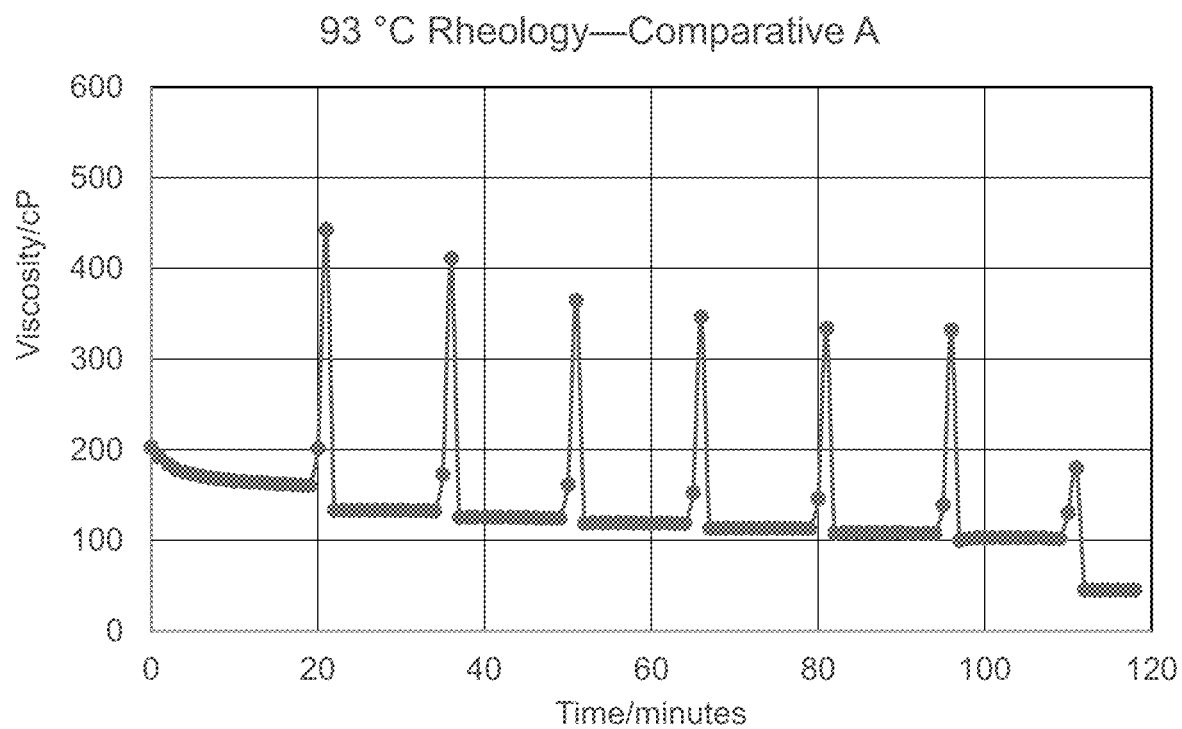
Figure 4D:
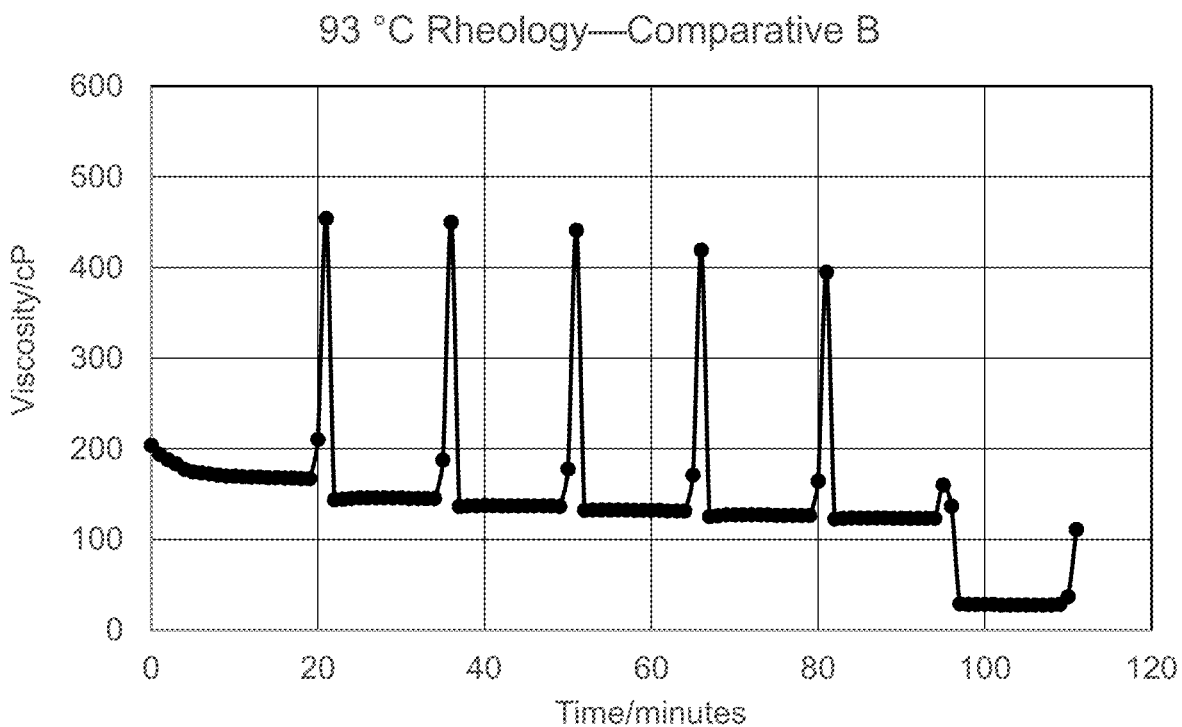

As used throughout this disclosure, the term "hydraulic fracturing" refers to a stimulation treatment routinely performed on hydrocarbon wells in reservoirs with a permeability of less than 10 milliDarcys. Hydraulic fracturing fluids are pumped into a subsurface formation, causing a fracture to form or open. The wings of the fracture extend away from the wellbore in opposing directions according to the natural stresses within the subsurface formation. Proppants are mixed with the treatment fluid to keep the fracture open when the treatment is complete. Hydraulic fracturing creates fluidic communication with a subsurface formation and bypasses damage, such as condensate banking, that may exist in the near-wellbore area.

As used throughout this disclosure, the term "subterranean formation" refers to a body of rock that is sufficiently distinctive and continuous from the surrounding rock bodies that the body of rock can be mapped as a distinct entity. A subterranean formation is, therefore, sufficiently homogenous to form a single identifiable unit containing similar rheological properties throughout the subsurface formation, including, but not limited to, porosity and permeability. A subterranean formation is the fundamental unit of lithostratigraphy.

As used throughout this disclosure, the term "lithostatic pressure" refers to the pressure of the weight of overburden, or overlying rock, on a subsurface formation.

As used throughout this disclosure, the term "producing subsurface formation" refers to the subsurface formation from which hydrocarbons are produced.

As used throughout this disclosure, the term "proppants" refers to particles mixed with hydraulic fracturing fluid to hold fractures open after a hydraulic fracturing treatment. Proppant materials are carefully sorted for mesh size, roundness and sphericity to provide an efficient conduit for fluid production from the reservoir to the wellbore.

As used throughout this disclosure, the term "drilling fluid" refers to liquid and gaseous fluids and mixtures of fluids and solids (as solid suspensions, mixtures and emulsions of liquids, gases and solids) used in operations to drill wellbores.

As used throughout this disclosure, the term "reservoir" refers to a subsurface formation having sufficient porosity and permeability to store and transmit fluids.

As used throughout this disclosure, the term "wings" refers to the two cracks formed by a fracture being 180° apart and typically similar in shape and size.

As used throughout this disclosure, the term "wellbore" refers to the drilled hole or borehole, including the openhole or uncased portion of the well. Borehole may refer to the inside diameter of the wellbore wall, the rock face that bounds the drilled hole.

To produce hydrocarbons from a hydrocarbon-containing reservoir, production wells are drilled to a depth that enables hydrocarbons to travel from the subsurface formation to the surface. However, when producing hydrocarbon gas, the wellbore and subsurface formation pressure decrease as the volume of hydrocarbon gas in the reservoir decreases. If pressure decreases to less than the dew point of the hydrocarbon gas, condensate may form and create a liquid blockage. This liquid blockage decreases the permeability between the wellbore and the subsurface formation thereby decreasing the rate of production of the hydrocarbon gas.

Reference will now be made in detail to hydraulic fracturing fluids. Methods of preparing the hydraulic fracturing fluids and methods of treating a subterranean formation with the hydraulic fracturing fluids will be described subsequently.

A hydraulic fracturing fluid includes an aqueous fluid, a synthetic polymer, a crosslinker that crosslinks the synthetic polymer to form a crosslinked gel, and, optionally, one or more additional inert additives. In some examples, the synthetic polymer may be a carboxyl-containing polymer such as a carboxyl-containing synthetic polymer produced from one or more monomers containing carboxyl groups or derivatives thereof, such as salts or esters of the carboxyl containing monomers. Examples of carboxyl-containing polymers include acrylates and polyacrylamides (PAMs). The crosslinker interacts with at least a portion of carboxyl-containing synthetic polymer in solution with the aqueous fluid (also called a base fluid) to form the crosslinked gel having a three-dimensional polymer network, thereby increasing stability and viscosity of the hydraulic fracturing fluid. Increased viscosity in a hydraulic fracturing fluid leads to better suspension of the proppant in the fracturing fluid. In turn, proper suspension of the proppant holds the subterranean formation open to allow extraction of the gas or oil without any damage to the subterranean formation.

In some aspects, the crosslinked gel of the hydraulic fracturing fluid may include the aqueous fluid, an acrylamide-based polymer, and a hyperbranched crosslinker that crosslinks the acrylamide-based polymer. The hyperbranched crosslinker is a hyperbranched polyethyleneimine polyoxiranylalkanol having a weight-average molecular weight from 10 kDa to 1500 kDa.

The aqueous fluid of the hydraulic fracturing fluid may be any water-based medium suitable for hydraulic fracturing operations, the specifications and requirements of which should be understood to the person having ordinary skill in the art of hydraulic fracturing. Examples of aqueous fluids include water or a solution containing both water and one or more organic or inorganic compounds dissolved in the water or otherwise completely miscible with the water. The aqueous fluid may contain water from any source, including freshwater, well water, filtered water, distilled water, sea water, salt water, produced water, formation brine, other type of water, or combinations of waters. The aqueous fluid may contain brine, including natural and synthetic brine. The aqueous fluid may include water containing water-soluble organic compounds, such as alcohols, organic acids, amines, aldehydes, ketones, esters, or other polar organic compounds for example, or salts dissolved in the water. The aqueous phase may include salts, water-soluble organic compounds, or both, as impurities dissolved in the water. Alternatively, in embodiments, the aqueous phase may include salts, water-soluble organic compounds, or both salts and water-soluble organic compounds to modify at least one property of the aqueous phase, such as the density of the aqueous phase. In some embodiments, increasing the amount of salt, water-soluble organic compounds, or both salt and water-soluble organic compounds in the aqueous phase may increase the density of the hydraulic fracturing fluid. In some embodiments, salts that may be present in the aqueous phase may include metal salts such as sodium salts, calcium salts, cesium salts, zinc salts, aluminum salts, magnesium salts, potassium salts, strontium salts, silicates, lithium salts, or combinations of these, for example. The metal salts may be in the form of chlorides, bromides, carbonates, hydroxides, iodides, chlorates, bromates, formates, nitrates, sulfates, phosphates, oxides, fluorides or combinations of these, for example.

The acrylamide-based polymer of the hydraulic fracturing fluid may be a polyacrylamide polymer or copolymer. Examples of polyacrylamide polymers include polyacrylamide homopolymer, a polyacrylamide copolymer, a polyacrylamide terpolymer, a polyacrylamide tetrapolymer, or combinations thereof. The polyacrylamide polymer, whether a copolymer, terpolymer, or tetrapolymer may include at least one monomer selected from the group consisting of acrylic acid, or other monomers containing carboxyl groups or their salts or esters such as acrylates, and combinations thereof. Examples of such acrylates include, without limitation, methyl acrylate, ethyl acrylate, n-propyl acrylate, isopropyl acrylate, n-butyl acrylate, isobutyl acrylate, tert-butyl acrylate, and n-octyl acrylate. The acrylamide-based polymer may include other monomers in addition to the carboxyl-containing monomer. Such other monomers may include, for example, acrylamide, methacrylamide, or N-substituted acrylamides. Further examples of said N-substituted acrylamides include, among others, N-methyl acrylamide, N-propyl acrylamide, N-butyl acrylamide, N,N-dimethyl acrylamide, and N-methyl-N-sec-butyl acrylamide.

As stated previously, the hyperbranched crosslinker crosslinks the acrylamide-based polymer to form the crosslinked gel in the hydraulic fracturing fluid. Various amounts of the hyperbranched crosslinker are contemplated for the crosslinked gel. In one example, the hydraulic fracturing fluid may include from 1 pound to 100 pounds of crosslinked gel per thousand gallons of hydraulic fracturing fluid. In another example, the hydraulic fracturing fluid may include from 15 pounds to 50 pounds of crosslinked gel per thousand gallons of hydraulic fracturing fluid. In another example, the hydraulic fracturing fluid may include from 20 pounds to 45 pounds of crosslinked gel per thousand gallons of hydraulic fracturing fluid. It should be understood that the unit of pounds per thousand gallons (pptg) is customary and noted that 1.00 pptg is equivalent to approximately 0.120 grams per liter (g/L) or 120 grams per 1000 liters (g/1000 L).

The hydraulic fracturing fluid further includes hyperbranched crosslinker that crosslinks the acrylamide-based polymer. The hyperbranched crosslinker is or includes a hyperbranched polyethyleneimine polyoxiranylalkanol. In examples, the hyperbranched polyethyleneimine polyoxiranylalkanol has a weight-average molecular weight from 10 kDa to 1500 kDa.

Hyperbranched polymers in general belong to a structural class known as dendritic polymers, distinguished from other polymer types such as linear, branched or crosslinked. Within the class of dendritic polymers, hyperbranched polymers may be distinguished from dendrimers. Dendrimers are generally regarded as polymeric macromolecules composed of multiple perfectly-branched monomers radially emanating from a central core. The number of branch points increases upon moving from the dendrimer core to its surface and defines dendrimer generation. Dendrimers are characterized by a highly regular three-dimensional structure and very high homogeneity, with polydispersity indices approaching 1.0. Typically, dendrimers may be functionalized only at terminal groups. In contrast to dendrimers, hyperbranched polymers are densely branched, because any repeat unit of the polymer may be capable of serving as a branch point. Owing to this aspect, hyperbranched polymers have an irregular three-dimensional structure. While dendrimers typically have well defined structures and nearly monodisperse molecular weights, hyperbranched polymers typically are composed of a mixture of linear and branched units inside, with multifunctional groups on their periphery. Thus, hyperbranched polymers have more irregular structures with polydispersity of molecular weight than do dendrimers. Typical hyperbranched polymers have polydispersities of at least 1.1.

Hyperbranched polymers may be characterized according to typical properties of polymers including but not limited to, weight-average molecular weight ($M_w$), number-average molecular weight ($M_n$), polydispersity ($M_w/M_n$), and density. Hyperbranched polymers further may be characterized with respect to degree of branching and generations of branching.

Degree of branching refers to the number of monomers of a hyperbranched polymer that are branch units, as a fraction of the total number of monomers in the hyperbranched polymer. Typical hyperbranched polymers exhibit degrees of branching from 0.1 to 0.9, or 0.2 to 0.8, or 0.3 to 0.7, or 0.4 to 0.6.

Generations of branching describe the extent to which the hyperbranched polymer is branched from a main chain of the polymer. For example, a hyperbranched polyethyleneimine may have a polyethyleneimine main chain that can be traced from a starting ethyleneimine monomer to a terminal ethyleneimine monomer. Linear polyethyleneimine has by definition zero generations of branching. Branching of polyethyleneimine (PEI branching) may be accomplished by replacing a hydrogen atom on the nitrogen atom of an ethyleneimine monomer with a "branch" of polyethyleneimine. If all of such branches are themselves linear, then the main polymer has only one generation of PEI branching. Yet, if at least a portion of such branches themselves have polyethyleneimine branches, then the main polymer has at least two generations of PEI branching. For the hyperbranched polymer to be considered to have two generations of PEI branching, it is not necessary for every branch of the first generation of branches to itself have a second generation. Rather, the hyperbranched polymer is considered to have two generations of PEI branching whenever at least one first-generation branch of the main polymer includes at least one second-generation branch. Likewise, the hyperbranched polymer is considered to have three generations of PEI branching whenever at least one second-generation branch of the main polymer includes at least one third-generation branch.

Hyperbranched polyethyleneimines include polymers according to formula (Ia):

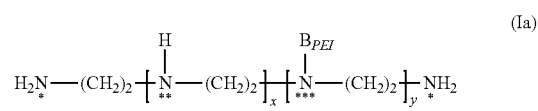

(Ia)

The structure of formula (Ia) represents the main chain of the hyperbranched polyethyleneimine. In formula (Ia), the nitrogen atoms are labeled with asterisks to illustrate the presence of primary amines (*), secondary amines (), and tertiary amines (*). The primary amines are present on terminal monomers of the main chain of the hyperbranched polyethyleneimine. The secondary amines are present on unbranched, linear monomers of the main chain of the hyperbranched polyethyleneimine. The tertiary amines are present on monomers that are branch points of the hyperbranched polyethyleneimine. Subscripts x and y represent molar fractions of monomers present in the main chain, where x is from 0 to 0.9, y is from 0.1 to 1, and the sum of x and y is 1.

The group $B_{PEI}$ bonded to the tertiary amine in the main chain of the hyperbranched polyethyleneimine is a polyethyleneimine branch of formula (IIa):

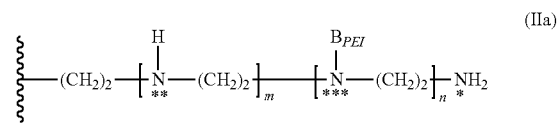

(IIa)

The structure of formula (IIa) represents a branch of the hyperbranched polyethyleneimine. In formula (IIa), the nitrogen atoms are labeled with asterisks to illustrate the presence of a primary amine (*), secondary amines (), and tertiary amines (*). The primary amine is present on a terminal monomer of the main chain of the hyperbranched polyethyleneimine. The secondary amines are present on unbranched, linear monomers of the branch of the hyperbranched polyethyleneimine. The tertiary amines are present on monomers that are further branch points of the hyperbranched polyethyleneimine. Subscripts m and n represent molar fractions of monomers present in the branch, where m is from 0 to 1, n is from 0 to 1, and the sum of m and n is 1. The group $B_{PEI}$ bonded to the tertiary amine is a further polyethyleneimine branch of formula (IIa). As should be readily understood, a polyethyleneimine branch bonded directly to the main chain of the hyperbranched polyethyleneimine represents a first generation of PEI branching, a polyethyleneimine branch bonded to a first-generation branch represents a second generation of PEI branching, a polyethyleneimine branch bonded to a second-generation branch represents a third generation of PEI branching, and so forth. In the hydraulic fracturing fluid, the hyperbranched polyethyleneimine may have from 1 to 20 generations of PEI branching, from 1 to 10 generations of PEI branching, from 1 to 5 generations of PEI branching, from 1 to 4 generations of PEI branching, from 1 to 3 generations of PEI branching, from 1 to 2 generations of PEI branching, or 1 generation of PEI branching. It should be understood further that, in the final generation of PEI branching, subscript n of the polyethyleneimine branch is necessarily zero.

In some examples, the total number of primary amines in the hyperbranched polyethyleneimine, the total number of secondary amines in the hyperbranched polyethyleneimine, and the total number of tertiary amines in the hyperbranched polyethyleneimine may be approximately equal to each other or may be within plus-or-minus 5%, 10%, 15%, or 20% of each other. It should be understood that the total number of amines of any kind in the hyperbranched polyethyleneimine include those in the main chain of formula (I), and also those in all PEI branches of formula (II).

The hyperbranched polyethyleneimine polyoxiranylalkanol of the hydraulic fracturing fluid is a copolymer including polyethyleneimine monomers of the hyperbranched polyethyleneimine of formula (Ia) and polyoxiranylalkanol monomers. Generally, polyoxiranylalkanol monomers result from the polymerization of an oxiranylalkanol compound of formula (Ib):

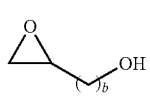
(Ib)

In formula (Ib), subscript b, representing a length of an alkylene chain of —(CH$_2$)— units, is an integer from 1 to 10, from 1 to 7, from 1 to 5, from 1 to 4, from 1 to 3, from 1 to 2, or equal to 1. When subscript b equals 1, the oxiranylalkanol is oxiranylmethanol (glycidol). When subscript b equals 2, the oxiranylalkanol is oxiranylethanol. When subscript b equals 3, the oxiranylalkanol is oxiranylpropanol. When subscript b equals 4, the oxiranylalkanol is, oxiranylbutanol. When subscript b equals 5, the oxiranylalkanol is oxiranylpentanol.

As should be understood by the skilled person, oxiranylalkanols may be polymerized by multiple methods distinguished by how the next oxiranylalkanol molecule attacks the reactive point of the propagating polyoxiranylalkanol polymer chain. Depending on the polymerization method used, a polyoxiranylalkanol prepared from an oxiranylalkanol compound according to formula (Ib) may have a general structure according to formula (IIIa) or formula (IVa):

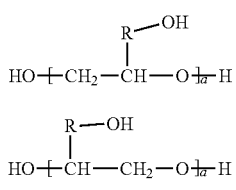

In formula (IIa) and formula (IVa), each R is —(CH$_2$)$_b$—, where b is as defined in formula (Ib). Subscript a represents a number of monomer units and may be from 1 to 1000, from 1 to 500, from 1 to 400, from 1 to 300, from 1 to 200, from 1 to 100, from 1 to 50, from 1 to 20, from 1 to 10, from 1 to 5, from 1 to 4, from 1 to 3, from 1 to 2, or equal to 1.

As will be described subsequently in detail, the groups —R—OH of the polyoxiranylalkanols according to formula (IIIa) and (IVa) may be readily further polymerized or functionalized. By further polymerization, additional oxiranylalkanol monomers are branched off a main polyoxiranylalkanol chain. By functionalization, the groups —R—OH serve as crosslinking sites to the acrylamide-based polymer of the hydraulic fracturing fluid to cause gelation, to facilitate gelation, or to stabilize or maintain a gel state of the hydraulic fracturing fluid.

Referring to the example structure of FIG. 1, in the hydraulic fracturing fluid, the hyperbranched polyethyleneimine polyoxiranylalkanol 1 may have a hyperbranched polyethyleneimine core 10 that includes polyoxiranylalkanol branch 20 monomer units. In the polyoxiranylalkanol branch monomer units, a polyoxiranylalkanol branch 20 is attached to a nitrogen atom of the hyperbranched polyethyleneimine core 10. For the sake of illustration only, which should be understood as not limiting to the scope of the hyperbranched polyethyleneimine polyoxiranylalkanol, the example hyperbranched polyethyleneimine polyoxiranylalkanol 1 of FIG. 1 includes a hyperbranched polyethyleneimine core 10 with 4 polyethyleneimine monomer units and having one generation of PEI branching, of which, four of the PEI monomers are PEI branches, for a degree of branching of 4/14=0.29. One or two polyoxiranylalkanol branches 20 are bonded to each of 7 of the 14 nitrogen atoms. In the specific example of FIG. 1, the hyperbranched crosslinker is a hyperbranched polyethyleneimine polyglycidol.

In the hydraulic fracturing fluid according to embodiments, the hyperbranched polyethyleneimine polyoxiranylalkanol is a polymer according to formula (I):

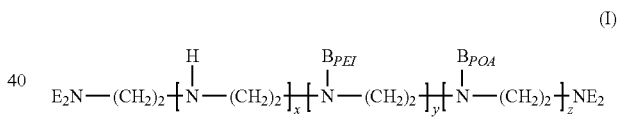
(I)

The polymer according to formula (I) may be a random copolymer or a block copolymer. In the polymer according to formula (I), each $B_{PEI}$ is a polyethyleneimine branch, each $B_{POA}$ is a polyoxiranylalkanol branch, and each E is hydrogen or a polyoxiranylalkanol branch. The subscripts x, y, and z represent mole fractions of monomers, where x is from 0 to 0.2, y is from 0.2 to 0.5, z is from 0.4 to 0.8, and x+y+z=1. The terminal groups -NE$_2$ may be functionalized with zero polyoxiranylalkanol branches, with one polyoxiranylalkanol branch, or with two polyoxiranylalkanol branches.

In formula (I), each polyethyleneimine branch has formula (II):

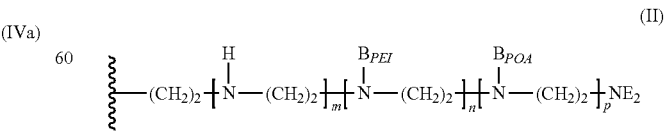
(II)

In formula (II), each $B_{PEI}$ is a further polyethyleneimine branch of formula (II), each $B_{POA}$ is a polyoxiranylalkanol branch, and each E is hydrogen or a polyoxiranylalkanol branch. The subscripts m, n, and p represent mole fractions of monomers, where m is from 0 to 0.2, n is from 0 to 0.5, p is from 0.4 to 0.8, and m+n+p=1. Subscript y of formula (I) and subscript n of formula (II) express a degree of PEI branching of the hyperbranched polyethyleneimine polyoxiranylalkanol.

In formula (I) and formula (II), each polyoxiranylalkanol branch has formula (III) or formula (IV):

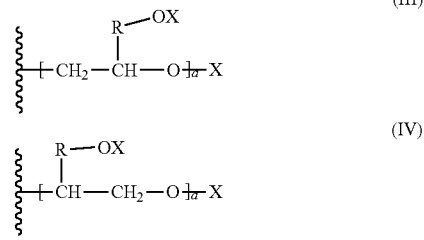

In formula (III) and formula (IV), R is —$(CH_2)_b$—, where b is an integer from 1 to 5. Subscript a, referring to a number of monomer units in a linear polyoxiranylalkanol chain, is from 1 to 100, from 1 to 50, from 1 to 40, from 1 to 30, from 1 to 20, from 1 to 10, from 1 to 5, from 1 to 4, from 1 to 3, from 1 to 2, or equal to 1. Each X is hydrogen, a crosslinking site to the acrylamide-based polymer, or an additional polyoxiranylalkanol branch according to formula (III) or formula (IV).

As should be readily understood, a polyoxiranylalkanol (POA) branch bonded directly to the main chain of the hyperbranched polyethyleneimine of formula (I) or directly to a polyethyleneimine branch of formula (II), represents a first generation of POA branching, a POA branch bonded to a first-generation POA branch represents a second generation of POA branching, a POA branch bonded to a second-generation POA branch represents a third generation of POA branching, and so forth. In the hydraulic fracturing fluid, the hyperbranched polyethyleneimine polyoxiranylalkanol may have POA branches that have from 1 to 20 generations of POA branching, from 1 to 10 generations of POA branching, from 1 to 5 generations of POA branching, from 1 to 4 generations of POA branching, from 1 to 3 generations of POA branching, from 1 to 2 generations of POA branching, or 1 generation of POA branching. It should be understood further that, in the final generation of POA branching, group X of the moiety —R—OX of the polyoxiranylalkanol branch is necessarily hydrogen or a crosslinking site to the acrylamide-based polymer.

In example embodiments of the hydraulic fracturing fluid, the hyperbranched polyethyleneimine polyoxiranylalkanol of formula (I), excluding all polyoxiranylalkanol branches, has a weight average molecular weight from 10 kDa to 1000 kDa. In this aspect, the hyperbranched polyethyleneimine polyoxiranylalkanol of formula (I) represents a polymer prepared by polymerizing polyoxiranylalkanol branches onto primary amines or secondary amines of a hyperbranched polyethyleneimine having a weight average molecular weight from 10 kDa to 1000 kDa.

In example embodiments of the hydraulic fracturing fluid, each polyoxiranylalkanol branch has formula (III) or each polyoxiranylalkanol branch has formula (IV). In this aspect, the hyperbranched polyethyleneimine polyoxiranylalkanol of formula (I) represents a polymer prepared by polymerizing polyoxiranylalkanol branches onto primary amines or secondary amines of a hyperbranched polyethyleneimine by a single polymerization technique or a one-pot synthetic route.

In example embodiments of the hydraulic fracturing fluid, each polyoxiranylalkanol branch has formula (III), or each polyoxiranylalkanol branch has formula (IV), and in formula (III) or formula (IV), each R is —$(CH_2)_b$—, where b is 1. In this aspect, the hyperbranched polyethyleneimine polyoxiranylalkanol of formula (I) represents a polymer prepared by polymerizing polyglycidol branches onto primary amines or secondary amines of a hyperbranched polyethyleneimine. Thus, the hyperbranched polyethyleneimine polyoxiranylalkanol of formula (I) would be a hyperbranched polyethyleneimine polyglycidol.

In example embodiments of the hydraulic fracturing fluid, the hyperbranched polyethyleneimine polyoxiranylalkanol of formula (I) has from 1 to 10 generations of PEI branching and from 0 to 10 generations of POA branching. In this aspect, the hyperbranched polyethyleneimine polyoxiranylalkanol of formula (I) represents a polymer prepared by polymerizing polyoxiranylalkanol branches onto primary amines or secondary amines of a hyperbranched polyethyleneimine, in which the polyoxiranylalkanol branches may be unbranched (zero generations) or may be branched or hyperbranched (from 1 to 10 generations).

In example embodiments of the hydraulic fracturing fluid, the hyperbranched polyethyleneimine polyoxiranylalkanol of formula (I) is a product of reacting a hyperbranched polyethyleneimine with an oxiranylalkanol to obtain the hyperbranched polyethyleneimine polyoxiranylalkanol of formula (I). In this aspect, the hyperbranched polyethyleneimine has formula (Ia):

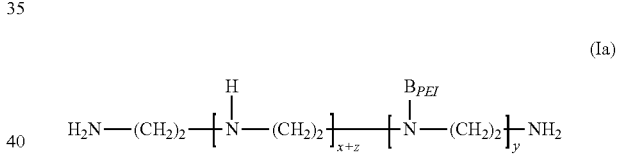

In formula (Ia), x, y, and z are as defined in formula (I). It should be understood that the sum of x and z in formula (Ia) represents the sum of secondary amine-containing monomer units, of which, x such monomer units are not functionalized by a POA branch in the polymer of formula (I) and z such monomer units are functionalized by a POA branch in the polymer of formula (I). In formula (Ia), each $B_{PEI}$ has formula (IIa):

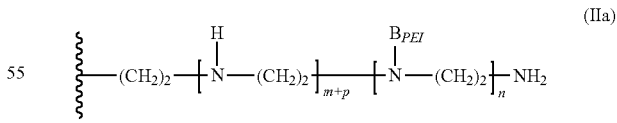

In formula (IIa), $B_{PEI}$, m, n, and p are as defined in formula (II). It should be understood that the sum of m and p in formula (IIa) represents the sum of secondary amine-containing monomer units in the PEI branch, of which, m such monomer units are not functionalized by a POA branch in the corresponding PEI branch of formula (II) in the polymer of formula (I) and p such monomer units are functionalized by a POA branch in the corresponding PEI branch of formula (II) in the polymer of formula (I).

The oxiranylalkanol has formula (Ib):

(Ib)

In formula (Ib), subscript b is an integer from 1 to 5, where b is as defined in formula (III) or formula (IV). In some examples, the oxiranylalkanol of formula (Ib) is glycidol (where subscript b is 1).

The hyperbranched polyethyleneimine of formula (Ia) has a weight-average molecular weight from 10 kDa to 1000 kDa. A ratio of the weight-average molecular weight of the hyperbranched polyethyleneimine polyoxiranylalkanol of formula (I) to the weight-average molecular weight of the hyperbranched polyethyleneimine of formula (Ia) is from 1.01 to 2, or from 1.2 to 2, or from 1.01 to 1.5. That is, upon reacting the hyperbranched polyethyleneimine with the oxiranylalkanol of formula (Ib), the weight-average molecular weight of the original hyperbranched polyethyleneimine is increased by about 1% to about 100%, by about 20% to about 100%, by about 1% to about 50%. The amount of molecular-weight increase from the reaction, as well as the generations of POA branching in the hyperbranched polyethyleneimine, may be tailored by choosing molar amounts of the oxiranylalkanol of formula (Ib) relative to the number of primary and secondary amine nitrogen atoms in the hyperbranched polyethyleneimine of formula (Ia).

In addition to the aqueous fluid, the acrylamide-based polymer, and the hyperbranched crosslinker, the hydraulic fracturing fluid may further include one or more additional ingredients or additives. Examples of such additives include, without limitation, clay-based components, proppants. The optional clay-based component may include one or more components selected from lime (CaO), $CaCO_3$, bentonite, montmorillonite clay, barium sulfate (barite), hematite ($Fe_2O_3$), mullite ($3Al_2O_3 \cdot 2SiO_2$ or $2Al_2O_3 \cdot SiO_2$), kaolin, ($Al_2Si_2O_5(OH)_4$ or kaolinite), alumina ($Al_2O_3$, or aluminum oxide), silicon carbide, tungsten carbide, or combinations thereof. Proppants within the hydraulic fracturing fluid may aid in treating subsurface fractures, to prop open and keep open the fracture. The hydraulic fracturing fluid in the subsurface fracture may comprise proppants suspended in the hydraulic fracturing fluid. In some embodiments, the proppants may be distributed throughout the hydraulic fracturing fluid. Proper suspension of the proppant holds a subterranean formation open to allow extraction of the gas or oil without any damage to the subterranean formation.

The hydraulic fracturing fluid optionally may include additives that alter the salt concentration of the crosslinked gel. In one or more embodiments, brine solution may be added, such as KCl brine or $CaCl_2$ brine. Optionally, the hydraulic fracturing fluid may include additional components such as buffers, antioxidants, biocides, clay stabilizers, diverting agents, fluid loss additives, friction reducers, iron controllers, or gel stabilizers. The fracturing fluid may further comprise a surfactant, which may be used to lower the surface tension of the fracturing fluid. Various surfactants are contemplated, for example, anionic surfactants, cationic surfactants, amphoteric surfactants, zwitterionic surfactants, or combinations thereof.

Optionally, the hydraulic fracturing fluid may also comprise a breaker to degrade the crosslinked gel. The breaker is used to "break" or reduce the viscosity of the fracturing fluid so that the fracturing fluid may be easily recovered from the fracture during clean up. In one or more embodiments, the breaker may be an acid, an oxidizer, an enzyme breaker, a chelating agent, or a combination thereof. Examples of breakers include, but are not be limited to sodium bromate, potassium bromate, sodium persulfate, ammonium persulfate, potassium persulfate, and various peroxides. Additionally, an encapsulant may be used to control or delay the release of the breaker encapsulated or disposed therein. In one or more embodiments, the breaker may include a combination of encapsulated and unencapsulated breaker. For example, the breaker may include a combination of sodium bromate and encapsulated sodium bromate.

Having described the hydraulic fracturing fluid in detail, methods of preparing the hydraulic fracturing fluid will now be described. Methods of preparing the hydraulic fracturing fluid include combining the aqueous fluid and the acrylamide-based polymer to obtain a stock solution. To the stock solution, at least one inert ingredient is added, chosen from buffers, antioxidants, biocides, clay stabilizers, diverting agents, fluid loss additives, friction reducers, iron controllers, gel stabilizers, or surfactants, for example. Before, during, or after the addition of the inert ingredient, the pH of the stock solution is adjusted to greater than 6. The hyperbranched crosslinker is added to the stock solution, and the stock solution is then agitated or stirred to allow a crosslinked gel to form and thereby obtain the hydraulic fracturing fluid.

The hydraulic fracturing fluids of this disclosure may be applied in methods of treating a subterranean formation. Methods of treating a subterranean formation include contacting the subterranean formation with a hydraulic fracturing fluid that includes an aqueous fluid, an acrylamide-based polymer, and a hyperbranched crosslinker comprising the hyperbranched polyethyleneimine polyoxiranylalkanol of this disclosure. Then, at least one subterranean fracture is propagated in the subterranean formation with the hydraulic fracturing fluid. In embodiments, contacting the subterranean formation may include injecting the hydraulic fracturing fluid into the subterranean formation. In embodiments, contacting the subterranean formation may further include drilling into the subterranean formation; and injecting the hydraulic fracturing fluid into the at least one subterranean fracture in the subterranean formation. In embodiments, the subterranean formation may include rock, shale, or coal.

Items Listing

Item 1: A hydraulic fracturing fluid comprising: an aqueous fluid; an acrylamide-based polymer; and a hyperbranched crosslinker that crosslinks the acrylamide-based polymer to form a crosslinked gel, wherein: the hyperbranched crosslinker comprises a hyperbranched polyethyleneimine polyoxiranylalkanol having a weight-average molecular weight from 10 kDa to 1500 kDa.

Item 2: The hydraulic fracturing fluid of Item 1, wherein the acrylamide-based polymer comprises a polyacrylamide, a polyacrylamide copolymer, a polyacrylamide terpolymer, a polyacrylamide tetrapolymer, or combinations thereof.

Item 3: The hydraulic fracturing fluid of Item 1 or 2, wherein the hyperbranched polyethyleneimine polyoxiranylalkanol comprises a hyperbranched polyethyleneimine core having polyoxiranylalkanol branch monomer units in which a polyoxiranylalkanol branch is attached to a nitrogen atom of the hyperbranched polyethyleneimine core, the polyoxiranylalkanol branches having from 1 to 100 oxiranylalkanol monomer units and from 0 to 5 generations of POA branching.

Item 4: The hydraulic fracturing fluid of any of the preceding Items, wherein the hyperbranched crosslinker is a hyperbranched polyethyleneimine polyglycidol.

Item 5: The hydraulic fracturing fluid of any of the preceding Items, wherein the hyperbranched polyethyleneimine polyoxiranylalkanol is a random copolymer or a block copolymer according to formula (I) as disclosed herein, where: each $B_{PEI}$ is a polyethyleneimine branch; each $B_{POA}$ is a polyoxiranylalkanol branch; each E is hydrogen or a polyoxiranylalkanol branch; x, y, and z represent mole fractions of monomers, where x is from 0 to 0.2, y is from 0.2 to 0.5, z is from 0.4 to 0.8, and x+y+z=1; each polyethyleneimine branch has formula (II) as disclosed herein, where: $B_{PEI}$, $B_{POA}$, and E are as defined in formula (I); and m, n, and p represent mole fractions of monomers, where m is from 0 to 0.2, n is from 0.2 to 0.5, p is from 0.4 to 0.8, and m+n+p=1; each polyoxiranylalkanol branch has formula (III) or formula (IV) as disclosed herein, where, in formula (III) and formula (IV): R is —(CH$_2$)—, where b is an integer from 1 to 5; a is from 1 to 100; each X is hydrogen, a crosslinking site to the acrylamide-based polymer, or an additional polyoxiranylalkanol branch according to formula (III) or formula (IV).

Item 6: The hydraulic fracturing fluid of Item 5, wherein the hyperbranched polyethyleneimine polyoxiranylalkanol of formula (I), excluding all polyoxiranylalkanol branches, has a weight average molecular weight from 10 kDa to 1000 kDa.

Item 7: The hydraulic fracturing fluid of Item 5 or 6, wherein each polyoxiranylalkanol branch has formula (III).

Item 8. The hydraulic fracturing fluid of any of Items 5 to 7, wherein each polyoxiranylalkanol branch has formula (III), in which each R is —(CH$_2$)$_b$—, where b is 1.

Item 9: The hydraulic fracturing fluid of any of Items 5 to 8, wherein the hyperbranched polyethyleneimine polyoxiranylalkanol of formula (I) has from 1 to 10 generations of PEI branching and from 0 to 10 generations of POA branching.

Item 10: The hydraulic fracturing fluid of any of Items 5 to 9, wherein the hyperbranched polyethyleneimine polyoxiranylalkanol of formula (I) is a product of reacting a hyperbranched polyethyleneimine of formula (Ia) as disclosed herein with an oxiranylalkanol of formula (Ib) as disclosed herein to obtain the hyperbranched polyethyleneimine polyoxiranylalkanol of formula (I) as disclosed herein. In formula (Ia), x, y, and z are as defined in formula (I); and each $B_{PEI}$ has formula (IIa) as disclosed herein, where $B_{PEI}$, m, n, and p are as defined in formula (II). In formula (Ib), b is an integer from 1 to 5. The hyperbranched polyethyleneimine of formula (Ia) has a weight-average molecular weight from 10 kDa to 1000 kDa. A ratio of the weight-average molecular weight of the hyperbranched polyethyleneimine polyoxiranylalkanol of formula (I) to the weight-average molecular weight of the hyperbranched polyethyleneimine of formula (Ia) is from 1.01 to 2.

Item 11: The hydraulic fracturing fluid of Item 10, wherein the oxiranylalkanol of formula (Ib) is glycidol.

Item 12: A method of preparing the hydraulic fracturing fluid according to any of Items 1 to 11, the method comprising: combining the aqueous fluid and the acrylamide-based polymer to obtain a stock solution; adding to the stock solution at least one inert ingredient chosen from buffers, antioxidants, biocides, clay stabilizers, diverting agents, fluid loss additives, friction reducers, iron controllers, gel stabilizers, and surfactants; adjusting the pH of the stock solution to greater than 6; adding the hyperbranched crosslinker to the stock solution; and agitating the stock solution to allow a crosslinked gel to form, thereby obtaining the hydraulic fracturing fluid.

Item 13: A method of treating a subterranean formation, the method comprising: contacting the subterranean formation with a hydraulic fracturing fluid according to any of Items 1 to 11 or a hydraulic fracturing fluid prepared according to the method of Item 12; and propagating at least one subterranean fracture in the subterranean formation with the hydraulic fracturing fluid.

Item 14: The method of Item 13, wherein contacting the subterranean formation comprises injecting the hydraulic fracturing fluid into the subterranean formation.

Item 15: The method of Item 13 or 14, wherein contacting the subterranean formation further comprises: drilling into the subterranean formation; and injecting the hydraulic fracturing fluid into the at least one subterranean fracture in the subterranean formation.

Item 16: The method of any of Items 13 to 15, wherein the subterranean formation comprises rock, shale, or coal.

EXAMPLES

The following Examples are offered by way of illustration and are presented in a manner such that one skilled in the art should recognize are not meant to be limiting to the present disclosure as a whole or to the appended claims.

To investigate polyacrylamide gelation characteristics of hyperbranched polyethyleneimine polyoxiranylalkanol polymers, ten samples were prepared according to the following procedure.

Into a 250-mL round bottomed flask was added from 8 grams to 12 grams of hyperbranched polyethyleneimine (PEI) of a given molecular weight, then 50 mL of distilled water was added, and the mixture was stirred at 60° C. for 1 to 2 hours until all the PEI had dissolved. Then, from 1 mL to 20 mL of glycidol was added to this mixture and the reaction mixture was left to stir at 60° C. for 72 hours. The specific amount of glycidol was chosen to provide sufficient moles of glycidol to react with all available primary and secondary amines of the hyperbranched PEI. The specific amounts of glycidol in this regard were based on general assumptions that the ratio of primary amines to secondary amines to tertiary amines in the hyperbranched PEI was approximately 1:1:1, that approximately 10% to 20% of the secondary amines would react with one molecule of glycidol, that all of the primary amines would react with one or two molecules of glycidol, and that glycidol would react with high preference with a primary or secondary amine of the PEI over polymerizing with a free molecule of glycidol already attached to the PEI. The molecular weight of a PEI repeat unit is approximately 43.0 g/mol, the molecular weight of glycidol is 74.1 g/mol, and the density of glycidol at 25° C. is about 1.11 g/mL.

The crude mixture was emptied into a beaker and, after cooling the mixture to room temperature, aqueous HCl was added slowly to bring the pH of the reaction mixture to approximately 7. The crude mixture then was purified by carrying out dialysis in water, using dialyses tubing with a molecular weight cut-off of 14 kDa to isolate a highly viscous product. The samples, prepared as Examples 1-10, are summarized in Table 1.

TABLE 1

Molecular structure details for the hyperbranched polymer samples tested.

| Example | PEI Molecular Weight $M_w$ | PEI Mass (g) | Repeat units (millimoles) | Glycidol Volume (mL) | Glycidol (millimoles) |
|---|---|---|---|---|---|
| Example 1 | 25 kDa | 11 | 256 | 1 | 15 |
| Example 2 | 25 kDa | 11 | 256 | 4 | 60 |
| Example 3 | 25 kDa | 11 | 256 | 8 | 120 |
| Example 4 | 25 kDa | 11 | 256 | 10 | 150 |
| Example 5 | 25 kDa | 11 | 256 | 12 | 180 |
| Example 6 | 25 kDa | 11 | 256 | 20 | 300 |
| Example 7 | 70 kDa | 8 | 186 | 12 | 180 |
| Example 8 | 70 kDa | 9 | 209 | 1 | 15 |
| Example 9 | 70 kDa | 9 | 209 | 4 | 60 |
| Example 10 | 70 kDa | 10 | 232 | 6 | 90 |

Characteristic proton-NMR spectra of the hyperbranched polymers, taken in $D_2O$ solvent, included medium-intensity peaks at 2.4 ppm to 3.2 ppm, attributed to functionalites of polyethyleneimine such as $-CH_2CH_2N(CH_2CH_2-)_2$, $-CH_2CH_2NH_2$, and $-CH_2CH_2NH(CH_2CH_2-)$ and medium-intensity peaks at 3.4 to 3.8 ppm, attributed to functionalities of polyglycidol such as $-CH_2-$ and $-CH-$.

Static tests were conducted to examine the effect of the hyperbranched polymers on the gelation of polyacrylamide at different pH values. To perform the static tests, 0.5 mL of a hyperbranched polymer sample in a 12% weight/weight solution of deionized water is mixed in a test tube with 10 mL of an 80 parts per thousand gallon (pptg) polyacrylamide solution, and subsequent gelation behavior is visually observed. Gelation was clearly evident by this procedure in the samples of Example 1, Example 4, Example 5, and Example 9.

Further tube testing was performed to check the effect of pH on the crosslinking properties. The tube testing determined that crosslinking did not occur at pH 4 but did occur at pH greater than 6.

Rheology testing

Rheology of the samples of Example 1, Example 4, Example 5, and Example 9 was tested with Chandler 5550 HPHT Rotational Viscometer. A standard ISO13503-1 testing schedule was followed by measuring viscosity at 100 $s^{-1}$, 75 $s^{-1}$, 50 $s^{-1}$, and 25 $s^{-1}$ every 15 minutes after initial heat-up at 100 $s^{-1}$ for 20 minutes. The ISO13503-1 protocol is hereby incorporated herein by reference in its entirety. The rheology data is provided in FIGS. 2A-2D.

As shown FIGS. 2A-2D, when mixed with PAM solution, some of the synthesized crosslinkers showed crosslinking properties. Except for Example 4 (FIG. 2B), all other samples show potential crosslinking properties. Example 6 (FIG. 2C) outperformed the other crosslinkers with a viscosity of 200 cp at 100 $s^{-1}$ and good stability. The crosslinker loading was 5 pptg.

A further rheological investigation was performed by comparing the hyperbranched polyethyleneimine polyglycidol crosslinker samples (Examples 6 and 9) with commercial hyperbranched PEI polymers (Comparative Example A and Comparative Example B) at both room temperature (18° C.) and 200° F. (93° C.). The testing was done with a full recipe of hydraulic fracturing fluid as listed in Table 3. The room-temperature data is provided in FIGS. 3A-3D, and the data at 200° F. (93° C.) is provided in FIGS. 4A-4D.

TABLE 2

Fracturing fluid recipe for comparative testing

| Component | Ingredient | Volume Percent |
|---|---|---|
| Polymer | Polyacrylamide | 0.016 |
| Surfactant | Flow-back enhancer | 0.002 |
| Clay Control | Tetramethylammonium chloride (TMAC) | 0.002 |
| Gel Stabilizer | TYZOR 212 (organic zirconate) | 0.002 |
| Aqueous Fluid | Water | Balance |

At room temperature (65° F.; 18° C.), all the four samples showed similar crosslinking properties and stability at 200 cP at 100 $s^{-1}$. On the other hand, when the temperature was increased to 200° F. (93° C.), the difference in the viscosity of the four tested samples was quite apparent. All of the samples showed a decrease in viscosity with time. The Example 6 composition (FIG. 4A) showed the fastest reduction of viscosity after 20 minutes. The two comparative PEI samples (FIGS. 4C-4D) held a relatively high viscosity through 100 minutes, and then a sharp decreased occurred. The Example 9 composition (FIG. 4B) was very stable with a viscosity around 120 cP after 20 minutes, and the stability was maintained through end of the testing. The Example 9 composition was thereby shown to have greater hydraulic fracturing fluid crosslinking potential than those of the comparative hyperbranched PEI compositions.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. The term "substantially" is used herein also to represent the degree by which a quantitative representation may vary from a stated reference without resulting in a change in the basic function of the subject matter at issue. Thus, it is used to represent the inherent degree of uncertainty that may be attributed to any quantitative comparison, value, measurement, or other representation, referring to an arrangement of elements or features that, while in theory would be expected to exhibit exact correspondence or behavior, may in practice embody something less than exact.

Unless otherwise defined, all technical and scientific terms used herein have the same meaning as commonly understood by one of ordinary skill in the art to which the invention belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that where a first component is described as "comprising" or "including" a second component, it is contemplated that, in some embodiments, the first component "consists" or "consists essentially of" the second component. Additionally, the term "consisting essentially of" is used in this disclosure to refer to quantitative values that do not materially affect the basic and novel characteristic(s) of the disclosure.

It should be understood that any two quantitative values assigned to a property or measurement may constitute a range of that property or measurement, and all combinations of ranges formed from all stated quantitative values of a given property or measurement are contemplated in this disclosure.

Though particular embodiments have been illustrated and described herein, it should be understood that various other changes and modifications may be made without departing from scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A hydraulic fracturing fluid comprising:
   an aqueous fluid;
   an acrylamide-based polymer; and
   a hyperbranched crosslinker that crosslinks the acrylamide-based polymer to form a crosslinked gel,
   wherein:
   the hyperbranched crosslinker comprises a hyperbranched polyethyleneimine polyoxiranylalkanol having a weight-average molecular weight from 10 kDa to 1500 kDa.

2. The hydraulic fracturing fluid of claim 1, wherein the acrylamide-based polymer comprises a polyacrylamide, a polyacrylamide copolymer, a polyacrylamide terpolymer, a polyacrylamide tetrapolymer, or combinations thereof.

3. The hydraulic fracturing fluid of claim 1, wherein the hyperbranched polyethyleneimine polyoxiranylalkanol comprises a hyperbranched polyethyleneimine core having polyoxiranylalkanol branch monomer units in which a polyoxiranylalkanol branch is attached to a nitrogen atom of the hyperbranched polyethyleneimine core, the polyoxiranylalkanol branches having from 1 to 100 oxiranylalkanol monomer units and from 0 to 5 generations of POA branching.

4. The hydraulic fracturing fluid of claim 1, wherein the hyperbranched crosslinker is a hyperbranched polyethyleneimine polyglycidol.

5. The hydraulic fracturing fluid of claim 1, wherein the hyperbranched polyethyleneimine polyoxiranylalkanol is a random copolymer or a block copolymer according to formula (I):

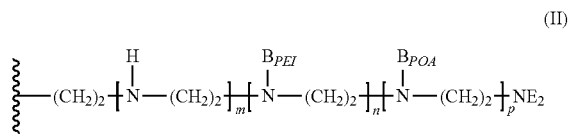

where:
  each $B_{PEI}$ is a polyethyleneimine branch;
  each $B_{POA}$ is a polyoxiranylalkanol branch;
  each E is hydrogen or a polyoxiranylalkanol branch;
  x, y, and z represent mole fractions of monomers, where x is from 0 to 0.2, y is from 0.2 to 0.5, z is from 0.4 to 0.8, and x+y+z=1;

each polyethyleneimine branch has formula (II):

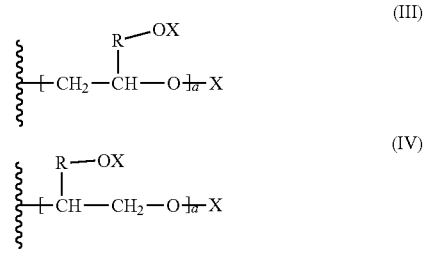

where:
  $B_{PEI}$, $B_{POA}$, and E are as defined in formula (I); and
  m, n, and p represent mole fractions of monomers, where m is from 0 to 0.2, n is from 0.2 to 0.5, p is from 0.4 to 0.8, and m+n+p=1;

each polyoxiranylalkanol branch has formula (III) or formula (IV):

$$\{-CH_2-CH(R-OX)-O\}_a-X \quad (III)$$

$$\{-CH(R-OX)-CH_2-O\}_a-X \quad (IV)$$

where, in formula (III) and formula (IV):
  R is $-(CH_2)_b-$, where b is an integer from 1 to 5;
  a is from 1 to 100; and
  each X is hydrogen, a crosslinking site to the acrylamide-based polymer, or an additional polyoxiranylalkanol branch according to formula (III) or formula (IV).

6. The hydraulic fracturing fluid of claim 5, wherein the hyperbranched polyethyleneimine polyoxiranylalkanol of formula (I), excluding all polyoxiranylalkanol branches, has a weight average molecular weight from 10 kDa to 1000 kDa.

7. The hydraulic fracturing fluid of claim 5, wherein each polyoxiranylalkanol branch has formula (III).

8. The hydraulic fracturing fluid of claim 5, wherein each polyoxiranylalkanol branch has formula (III), in which each R is $-(CH_2)_b-$, where b is 1.

9. The hydraulic fracturing fluid of claim 5, wherein the hyperbranched polyethyleneimine polyoxiranylalkanol of formula (I) has from 1 to 10 generations of PEI branching and from 0 to 10 generations of POA branching.

10. The hydraulic fracturing fluid of claim 5, wherein the hyperbranched polyethyleneimine polyoxiranylalkanol of formula (I) is a product of reacting a hyperbranched polyethyleneimine of formula (Ia):

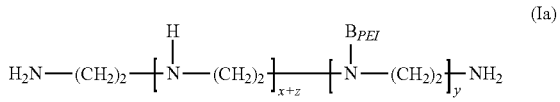

where:
x, y, and z are as defined in formula (I); and
each $B_{PEI}$ has formula (IIa):

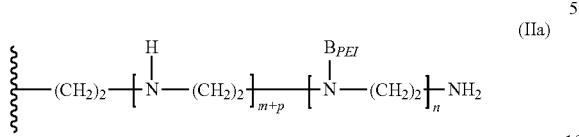
(IIa)

where $B_{PEI}$, m, n, and p are as defined in formula (II), with an oxiranylalkanol of formula (Ib):

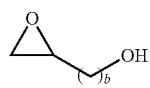
(Ib)

where b is an integer from 1 to 5, to obtain the hyperbranched polyethyleneimine polyoxiranylalkanol of formula (I), wherein:
the hyperbranched polyethyleneimine of formula (Ia) has a weight-average molecular weight from 10 kDa to 1000 kDa;
a ratio of the weight-average molecular weight of the hyperbranched polyethyleneimine polyoxiranylalkanol of formula (I) to the weight-average molecular weight of the hyperbranched polyethyleneimine of formula (Ia) is from 1.01 to 2.

11. The hydraulic fracturing fluid of claim 10, wherein the oxiranylalkanol of formula (Ib) is glycidol.

12. A method of preparing the hydraulic fracturing fluid according to claim 1, the method comprising:
combining the aqueous fluid and the acrylamide-based polymer to obtain a stock solution;
adding to the stock solution at least one inert ingredient chosen from buffers, antioxidants, biocides, clay stabilizers, diverting agents, fluid loss additives, friction reducers, iron controllers, gel stabilizers, and surfactants;
adjusting the pH of the stock solution to greater than 6;
adding the hyperbranched crosslinker to the stock solution; and
agitating the stock solution to allow a crosslinked gel to form, thereby obtaining the hydraulic fracturing fluid.

13. A method of treating a subterranean formation, the method comprising:
contacting the subterranean formation with a hydraulic fracturing fluid according to claim 1; and
propagating at least one subterranean fracture in the subterranean formation with the hydraulic fracturing fluid.

14. The method of claim 13, wherein contacting the subterranean formation comprises injecting the hydraulic fracturing fluid into the subterranean formation.

15. The method of claim 13, wherein contacting the subterranean formation further comprises:
drilling into the subterranean formation; and
injecting the hydraulic fracturing fluid into the at least one subterranean fracture in the subterranean formation.

16. The method of claim 13, wherein the subterranean formation comprises rock, shale, or coal.

\* \* \* \* \*